United States Patent
Votaw et al.

(10) Patent No.: US 8,930,498 B2
(45) Date of Patent: Jan. 6, 2015

(54) MOBILE CONTENT MANAGEMENT

(75) Inventors: Elizabeth S. Votaw, Potomac, MD (US); Marcia T. Jordan, Apex, NC (US); Melissa L. Loafman, Dallas, TN (US); Peter K. Buchhop, Cary, IL (US); Anne Bradford Fyk, Highland Park, IL (US); Krsto Sitar, Cicero, IL (US)

(73) Assignee: Bank of America Corporation, Charlotte, NC (US)

( * ) Notice: Subject to any disclaimer, the term of this patent is extended or adjusted under 35 U.S.C. 154(b) by 526 days.

(21) Appl. No.: 12/751,502

(22) Filed: Mar. 31, 2010

(65) Prior Publication Data
US 2011/0246614 A1 Oct. 6, 2011

(51) Int. Cl.
G06F 15/16 (2006.01)
G06Q 40/02 (2012.01)
G06Q 20/32 (2012.01)

(52) U.S. Cl.
CPC ............ *G06Q 40/02* (2013.01); *G06Q 20/3221* (2013.01)
USPC ............................ 709/219; 709/227; 709/246

(58) Field of Classification Search
USPC ........................................ 709/219, 227, 246
See application file for complete search history.

(56) References Cited

U.S. PATENT DOCUMENTS

| | | | |
|---|---|---|---|
| 5,784,612 A | 7/1998 | Crane et al. | |
| 6,741,853 B1 | 5/2004 | Jiang et al. | |
| 6,965,870 B1 | 11/2005 | Petras et al. | |
| 7,136,631 B1 | 11/2006 | Jiang et al. | |
| 7,546,956 B2 | 6/2009 | Adams et al. | |
| 7,730,135 B2 | 6/2010 | Petrovykh | |
| 7,925,243 B2 | 4/2011 | McGary | |
| 7,957,691 B1 | 6/2011 | Lee | |
| 2002/0090980 A1 * | 7/2002 | Wilcox et al. | 455/566 |
| 2002/0184150 A1 | 12/2002 | Wong et al. | |
| 2003/0014483 A1 * | 1/2003 | Stevenson et al. | 709/203 |
| 2004/0003294 A1 | 1/2004 | Moore | |
| 2004/0064707 A1 | 4/2004 | McCann et al. | |

(Continued)

FOREIGN PATENT DOCUMENTS

WO 2008149101 A2 12/2008

OTHER PUBLICATIONS

International Search Report for related PCT Application No. PCT/US2011/028594, mailed May 18, 2011, pp. 1-8.

(Continued)

*Primary Examiner* — David Lazaro
*Assistant Examiner* — Vitali Korobov
(74) *Attorney, Agent, or Firm* — Banner & Witcoff, Ltd.; Michael A. Springs

(57) ABSTRACT

A computer system interacts with a mobile device to support the needs of remote users and may leverage e-ink technology so that a mobile user can access, manage and read documents without being tethered. The mobile device allows for both user-initiated downloads from a corporate entity as well as corporate pushes by the corporate entity to ensure that the user has updated content. The computer system receives a request for selected electronic content, where the request includes updated configuration information and user identification. The computer system then maps the user identification to a device type from a plurality of device types. Embodiments support different device types including electronic ink display capable devices. The selected electronic content is then downloaded to the mobile device. Subsequently, the computer system pushes updated versions of the selected electronic content based on the updated configuration information.

19 Claims, 18 Drawing Sheets

(56) References Cited

U.S. PATENT DOCUMENTS

| | | |
|---|---|---|
| 2004/0162880 A1 | 8/2004 | Arnone et al. |
| 2004/0199665 A1* | 10/2004 | Omar et al. .................. 709/238 |
| 2005/0204147 A1 | 9/2005 | Yamasaki et al. |
| 2006/0137000 A1 | 6/2006 | Isaacson |
| 2006/0253874 A1* | 11/2006 | Stark et al. .................. 725/62 |
| 2007/0208863 A1 | 9/2007 | Otsuka et al. |
| 2007/0260674 A1* | 11/2007 | Shenfield .................. 709/203 |
| 2008/0034078 A1 | 2/2008 | Sano et al. |
| 2008/0109529 A1 | 5/2008 | Story |
| 2008/0147861 A1 | 6/2008 | Oishi et al. |
| 2008/0177998 A1* | 7/2008 | Apsangi et al. .................. 713/155 |
| 2008/0201199 A1 | 8/2008 | Armstrong et al. |
| 2009/0031006 A1* | 1/2009 | Johnson .................. 709/218 |
| 2009/0143141 A1* | 6/2009 | Wells et al. .................. 463/37 |
| 2009/0265734 A1 | 10/2009 | Dion et al. |
| 2009/0319425 A1 | 12/2009 | Tumminaro et al. |
| 2009/0325686 A1* | 12/2009 | Davis et al. .................. 463/25 |
| 2010/0004007 A1 | 1/2010 | Vogel et al. |
| 2010/0029306 A1 | 2/2010 | Sarmah et al. |
| 2010/0174756 A1 | 7/2010 | Lazaridis et al. |
| 2010/0178898 A1 | 7/2010 | Dupuis et al. |
| 2010/0191602 A1 | 7/2010 | Mikkelsen et al. |
| 2010/0205148 A1 | 8/2010 | Leblanc et al. |
| 2010/0325194 A1 | 12/2010 | Williamson et al. |
| 2011/0041161 A1* | 2/2011 | Capati et al. .................. 726/4 |
| 2011/0055410 A1 | 3/2011 | Iwase |
| 2011/0060684 A1 | 3/2011 | Jucht et al. |
| 2011/0141276 A1 | 6/2011 | Borghei |
| 2011/0145739 A1 | 6/2011 | Berger et al. |
| 2011/0159884 A1 | 6/2011 | Chawla |
| 2012/0036442 A1* | 2/2012 | Dare et al. .................. 715/736 |
| 2013/0065608 A1 | 3/2013 | Nakajima et al. |

OTHER PUBLICATIONS

International Search Report for related PCT Application No. PCT/US2011/028599, mailed May 18, 2011, pp. 1-8.

International Search Report for related PCT Application No. PCT/US2011/028603, mailed May 18, 2011, pp. 1-8.

Newton, Harry; Newton's Telecom Dictionary, "ESN" (definition), 2005, 3 pgs. CMP Books, San Francisco, CA.

Extended European Search Report from related EP Application No. EP 11763211.7 (PCT/US2011/028599), mailed Apr. 9, 2014, pp. 1-5.

* cited by examiner

1001

The user is alerted and directed to view the account statement on their mobile device; for devices where document display is not handled automatically, the client library will be invoked to display the account statement via the Content Handler API

FIG. 10

MOBILE CONTENT MANAGEMENT

FIELD

Aspects of the embodiments generally relate to a computer system that integrates a business infrastructure to different mobile device types. In particular, electronic content is pushed to an electronic ink device based on updated configuration information.

BACKGROUND

Bank customers are increasingly using mobile banking services (e.g., M-Banking, mbanking, and SMS Banking) to perform balance checks, account transactions, and payments via a mobile device such as a mobile phone. For example, according to one industry survey, banks that offer mobile financial services may increase the number of new customer acquisitions by as much as sixty percent. The current pace of mobile adoption appears to be exceeding that of past innovations, including ATMs, debit cards, and online banking. About a third of consumers are currently using, or at least considering using, mobile financial services in the next year, and some projections forecast that mobile financial service adoption will exceed the use of on-line banking by 2015.

Mobile banking is currently most often performed via short message service (SMS) or the mobile Internet but also may use special programs called clients downloaded to the mobile device. New types of mobile devices are being and will continue to be introduced in the future. For example, as smartphone adoption continues to rise and more sites and apps accommodate them, our culture is headed for a very mobile world at a very fast pace. However, content distribution to mobile devices is currently limited, difficult, and done sporadically or not at all. It is thus important that mobile banking support the ubiquity of mobile devices.

BRIEF SUMMARY

Aspects of the embodiments address one or more of the issues mentioned above by disclosing methods, computer readable media, and apparatuses for supporting a mobile implementation channel that enables secure mobile customer alerts, content delivery, event and location awareness and context integration that can be leveraged across multiple lines of business using basic interfaces. The mobile implementation channel enables secure reach to many mobile device types, abstracts away delivery peculiarities, and provides logging and security support when necessary taking into account who the individual is, where they are, and what they may be doing; thus leveraging identity, location (e.g., location-based services), and activity (e.g., business process management).

With an aspect of the embodiments, a mobile device supports the needs of remote users and may leverage e-ink technology so that a user can access, manage and read documents without being tethered to a computer. The mobile device allows for both user-initiated downloads from a corporate entity as well as corporate pushes by the corporate entity to ensure that the user has updated content.

With another aspect of the embodiments, a computer system receives a request for selected electronic content, where the request includes updated configuration information and user identification. The computer maps the user identification to a device type from a plurality of device types. Embodiments support different device types including electronic ink display capable devices. The selected electronic content is then downloaded to the mobile device of the user. Subsequently, the computer system pushes updated versions of the selected electronic content based on the updated configuration information.

Aspects of the embodiments may be provided in a computer-readable medium having computer-executable instructions to perform one or more of the process steps described herein.

These and other aspects of the embodiments are discussed in greater detail throughout this disclosure, including the accompanying drawings.

BRIEF DESCRIPTION OF THE DRAWINGS

The present invention is illustrated by way of example and not limited in the accompanying figures in which like reference numerals indicate similar elements and in which:

FIG. 10 shows a continuation of the flow diagram shown in FIG. 9 in accordance with various aspects of the embodiments.

DETAILED DESCRIPTION

Figure 1:
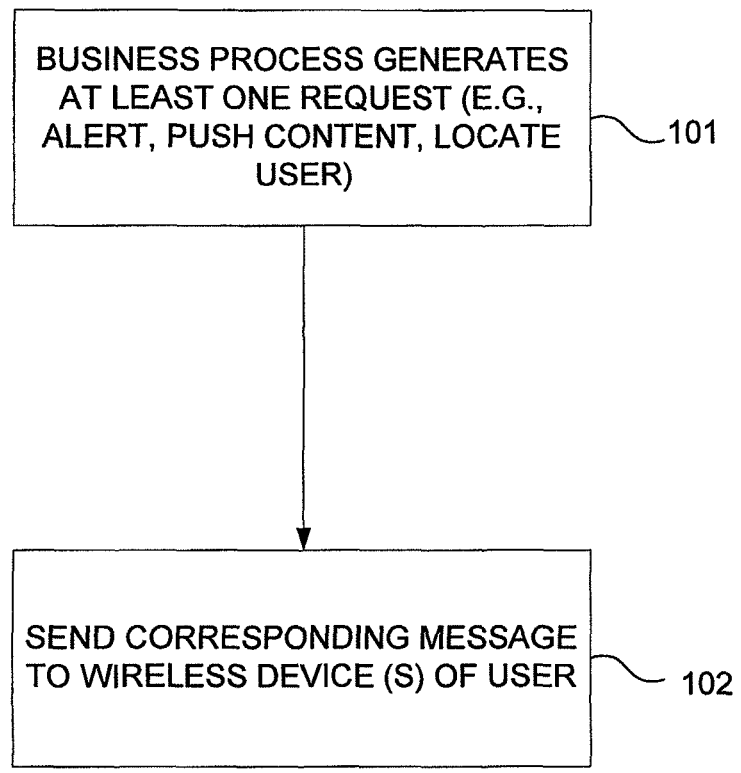
FIG. 1 shows flow diagram in which a business process generates requests to a wireless device in accordance with various aspects of the embodiments.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

In the description herein, the following terms are referenced.

Mobile banking: Mobile banking may include mobile banking services (e.g., M-Banking, mbanking, and SMS Banking) for performing balance checks, account transactions, and payments via a mobile device such as a mobile phone, and the like. Financial institutions are offering products that are directed to mobile banking. For example, a cash management banking channel, which features intuitive technology that allows commercial and corporate clients to move beyond transactions to focus on their core businesses and provides a single point of access to global treasury, debt, cash management, investments, trade finance, foreign exchange services and other financial capabilities. Also, financial institutions may offer free mobile banking, in which customers use mobile phones or devices to bank in several ways: Mobile Web or with Mobile Applications.

Push: A push (or "server-push") may include, for example, the delivery of information on the Web that is initiated by the information server rather than by the information user, recipient or client, as it usually is. In contrast, a pull is generated by specifically requesting information from a particular source. Downloading web pages with a web browser is an example of pull technology.

In accordance with various aspects of the embodiments, methods, computer-readable media, and apparatuses are disclosed to support a mobile implementation channel that enables secure mobile customer alerts, content delivery, event and location awareness and context integration that can be leveraged across multiple lines of business using basic interfaces. The mobile implementation channel enables secure reach to many mobile device types, abstracts away delivery peculiarities, and provides logging and security support when necessary taking into account who the individual is, where they are, and even what they may be doing; thus leveraging identity, location (e.g., location-based services), and activity (e.g., business process management).

Mobile banking is currently most often performed via short message service (SMS) or the mobile Internet but may also use special programs called clients downloaded to the mobile device. However, content distribution to mobile devices is currently limited, difficult, and done sporadically or not at all. In addition, it is often difficult to distribute content across multiple device types, to relate devices to location, or to integrate with existing workflow implementations, enterprise content management (ECM), or business intelligence (aka reporting).

FIG. 1 shows a flow diagram in which a business process generates requests to a wireless device in accordance with various aspects of the embodiments. Aspects of the embodiments generally relate to a computer system that integrates a business infrastructure, which is processing business process 101, to different mobile device types (corresponding to block 102). The business process may be based on a business process model or workflow. For example a workflow may include a sequence of connected steps in order to depict a sequence of operations representing work of a person, a group of persons, an organization of staff, or one or more simple or complex mechanisms.

Alerts, content delivery, event and location awareness can be provided to an appropriate mobile channel based on the context for multiple lines of business. Business process 101 may be based on a business infrastructure that further applies a layer of security, in which a request may be generated at appropriate points of business process 101. Examples of requests include, but are not limited to, an alert to a user, push content to the user, and obtaining the location of the user.

Figure 2:
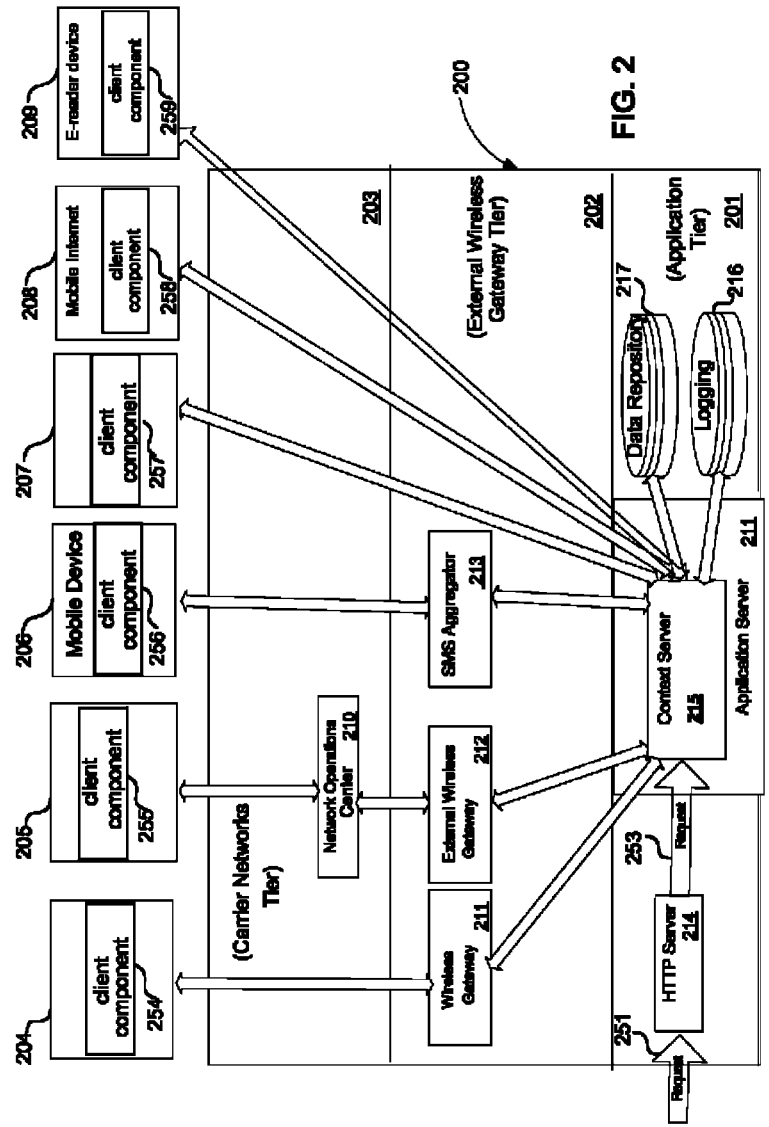
FIG. 2 shows a system that integrates different wireless devices with a business process model in accordance with various aspects of the embodiments.

Block 102 then sends a message to a wireless device of the user based on the device type. Different types of mobile device types may be supported, including mobile Internet devices, and SMS-capable mobile devices. With some embodiments, block 102 is implemented as middleware that is executed at Context Server 215 as shown in FIG. 2. Block 102 processes the request based on who is the user, where the user is, what the user is doing, and what the user wants. The request may be initiated though an application programming interface (API), in which business process 101 provides a user identity. With some embodiments, the API may be based on REST-style architectures that consist of clients and servers. Clients initiate requests to servers. The servers then process requests and return appropriate responses. Requests and responses are built around the transfer of representations of resources. A resource may be essentially any coherent and meaningful concept that may be addressed. A representation of a resource is typically a document that captures the current or intended state of a resource. Block 102 then determines what type of device the user is associated with and directs the request accordingly. Also, if content is being pushed to the user, the format of the content may be formatted in accordance with the associated device type.

Business process 101 may be associated with different types of businesses. While some of the examples described herein may be related to financial institutions, embodiments may also support other types of businesses including manufacturing, service businesses, retailers, information businesses, and high technology businesses.

FIG. 2 shows system 200 that integrates different wireless devices 204-209 with a business process model in accordance with various aspects of the embodiments. With traditional systems there may be a significant amount of complexity regarding the wireless channel resulting in the mobile channel being underutilized for associates and customers, in which usage may be limited to mobile web-content. However, mobile banking services are trending toward a richer offering for the user. For example, a bank may offer on-line banking customers mobile banking, in which a customer may access an account through the mobile web or with a mobile application. Mobile applications may be provided for different mobile devices, including one type of commercially available mobile phone devices (e.g., device 204) another type of commercially available mobile phone devices (e.g., device 205), and another type of commercially available mobile phone devices (e.g., device 207). The mobile applications may be designed to provide a customized mobile banking experience and to offer convenience to the user. Moreover, Context Server 215 may support new device types as they become available by integrating only components at tiers 202 and 203 that support the new device type.

With some embodiments, mobile banking provides a richer set of functioning alternatives to the general web based banking features. However, the alternatives typically circumvent a piecemeal, fragmented fashion with little continuity. As the feature and customer space grows both in size and capability, there may be more offerings, and consequently embodiments should avoid potentially more fragmentation so that a user (customer) is offered a coherent relationship channel to the financial institution.

System 200 provides a mobile implementation channel to enable secure mobile customer alerts, content delivery, event and location awareness and context integration that can be leveraged across multiple lines of business using simple interfaces. System 200 enables secure reach to different mobile device types, abstracts away delivery peculiarities, and provides logging and security support when necessary taking into account who the user of a mobile device is, where the user is, and what the user may be doing, consequently leveraging identity, location (location based services), and activity (business process management). Thus, system 200 processes requests based on the user context, where supporting system components may be referenced with the term "wContext" in the description herein.

With an aspect of the embodiments, system 200 supports enterprise integration using either a console, device library, RESTful API, or direct industry standard XML Process Definition Language (XPDL) or Java specification requests (e.g., JSR 211) for business process management (BPM) or enterprise content management (ECM), respectfully. In addition, some embodiments handle the security, logging, and delivery details based on the request preference.

System 200 may be modeled into layered tiers, including application tier 201, external wireless gateway tier 202, and carrier networks tier 203, in which system components are partitioned into application components, external wireless gateway components, and carrier network components, respectively.

Context Server 215 determines which devices the users (identified administrators) have from request 251 through HTTP server 214 and pushes the alert request through the appropriate mobile channel(s) to the devices. For different device types, the request may be directed to different mobile channel types. For example, with certain devices 205, the push may be sent through an External Wireless Gateway 212 to a Network Operations Center 210. With other devices 204, the push may be sent through a Push Notification Service Wireless Gateway 211. With other devices 207, mobile internet device 208, or E-reader device 209, the push may be sent directly to device 207 through the wireless network and processed by the client component 254-258. Also, Context Server 215 may support short message service (SMS)-capable mobile devices (e.g., mobile device 206) through SMS aggregator 213, which functions as an SMS gateway.

Request 251 may include one or more request type, including alert, location request, push ECM content), and content. Request 251 may be initiated from a Web console, device, or application via the API. With some embodiments, request 251 includes a user identity. Context Server 215 may access data repository 217 in order to obtain the type of device type for the user's device. Context Server 215 consequently directs the request through the appropriate mobile channel type based on the device type.

With some embodiments, client components 254-258 provides the appropriate device type of mobile devices 204-208 to Context Server 215 when the mobile device registers. Also, with some embodiments, client components 254-258 obtain location information for the mobile device, e.g., from a Global Positioning System (GPS) receiver, and report the location information when a request is received from Context Server 215. Consequently, client components 254-258 automatically provide overhead information to system 200 so that the user is not burdened with inputting this information.

Figure 3:
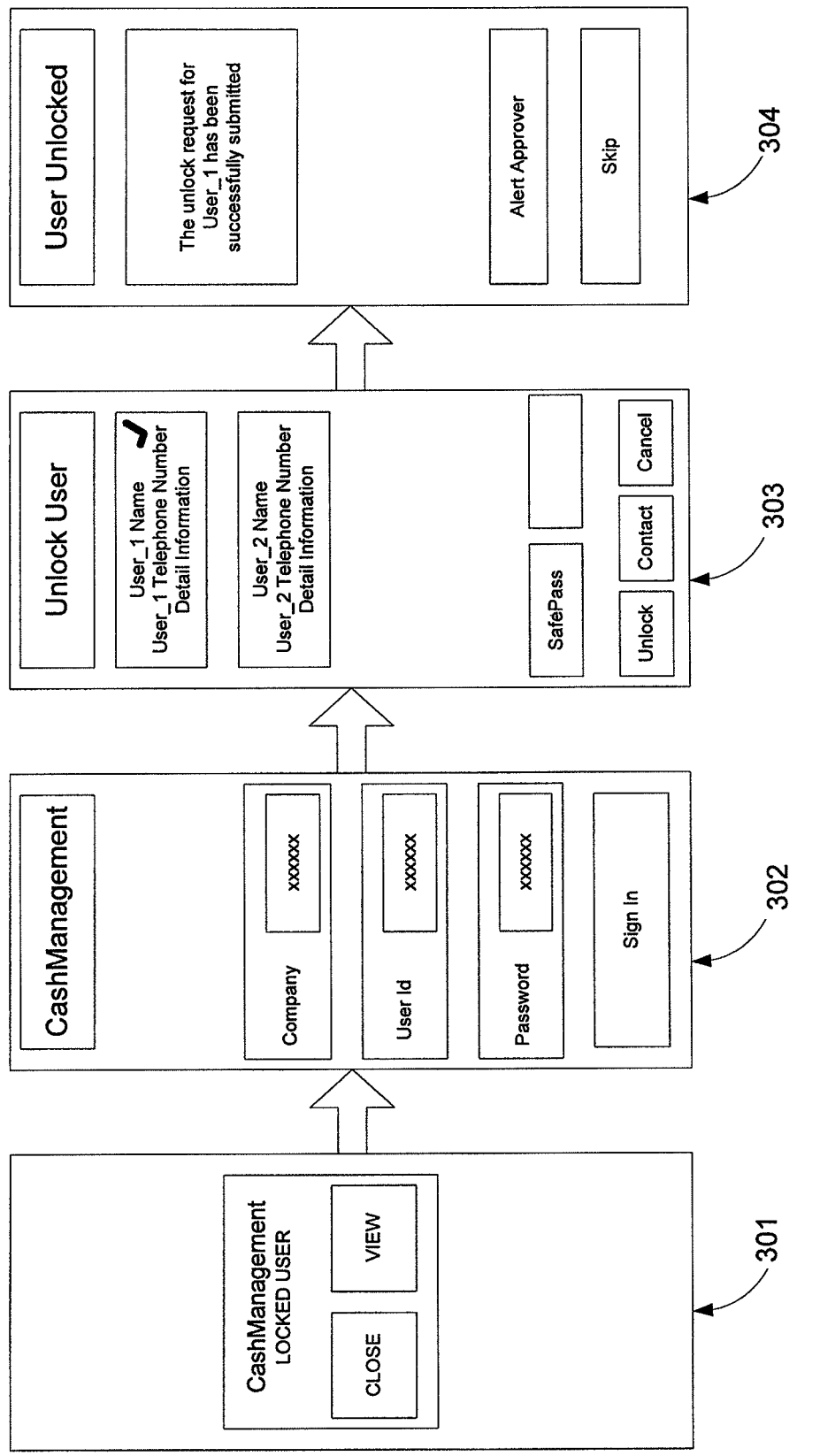
FIG. 3 shows an illustrative screenshots when unlocking a cash management account in accordance with various aspects of the embodiments.

FIG. 3 shows illustrative screenshots 301-304 when unlocking a cash management account in accordance with various aspects of the embodiments. The cash management banking channel, which may support mobile banking services, features intuitive technology that allows commercial and corporate clients to move beyond transactions to focus on their core businesses. The result of a multi-million dollar investment that addresses the needs and preferences of clients. The cash management service may provide a single point of access to global treasury, debt, cash management, investments, trade finance, foreign exchange services, and other financial capabilities.

With traditional systems, when a cash management user is locked out of the user's account, the user contacts (e.g., by phone/email) one of the designated cash management administrators at the user's company. The contacted administrator then logs into the cash management service (via desktop/laptop) and submits the unlock request. A second administrator then is contacted (e.g., by phone/email) to approve the request in the cash management service (via desktop/laptop).

With an aspect of the embodiments, system 200 enables an administrator to unlock and approve unlocks from mobile device 204, 205, 206, 207, or 208 so that the administrator does not have to be at their desk or start up their laptop. An automatic push alert notification is generated so that the system notifies the next person in the process automatically once a step is completed.

The scenario shown in FIG. 3 assumes that the user (customer), after being locked out, selects a link "Request Account Unlock" in the cash management service. This action causes the cash management service to push an alert message push to the designated administrator(s) for the user's company. The first administrator sees an alert on the administrator's mobile device for a "Locked User" in screenshot 301. When the first administrator clicks on "View", the first administrator is presented with screenshot 302 so that the first administrator can sign-in. The first administrator is then presented with "Unlock User" page 303, where the first administrator can select the user(s) and submit the unlock request. Once the request has been successfully submitted, the first administrator can use the "Alert Approver" in screenshot 304 to notify a second administrator that there is a request that needs to be approved.

Figure 4:
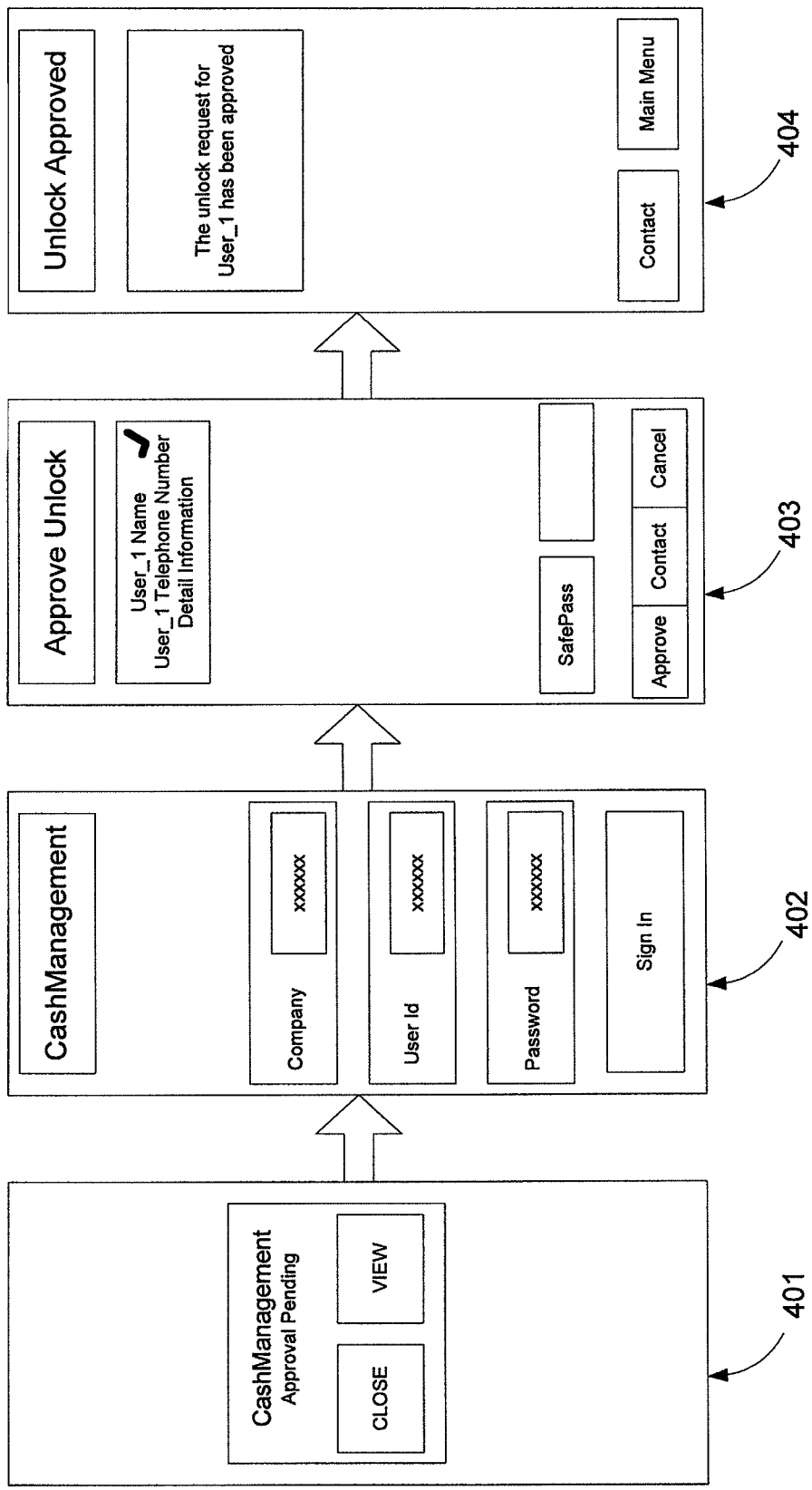
FIG. 4 shows a continuation of the screenshots shown in FIG. 3 in accordance with various aspects of the embodiments.

FIG. 4 shows screenshots 401-404, which are a continuation of screenshots shown in FIG. 3 in accordance with various aspects of the embodiments. With screenshot 401, the second administrator receives an alert on the administrator's mobile device for an unlock request that is pending approval. When the second administrator clicks on "View", screenshot 402 is presented so that the second administrator can sign-in. "Approve Unlock" page 403 is then presented so that the second administrator can select the user(s) and approves the unlock. When the approval has been completed, screenshot 404 is presented to the second administrator.

With some embodiments, an administrator can select the "Contact" button at any point during the scenario to call, generate a SMS message, or e-mail the user or another administrator from the administrator's mobile device. The Main Menu may allow the user to unlock and approve users directly.

Figure 5:
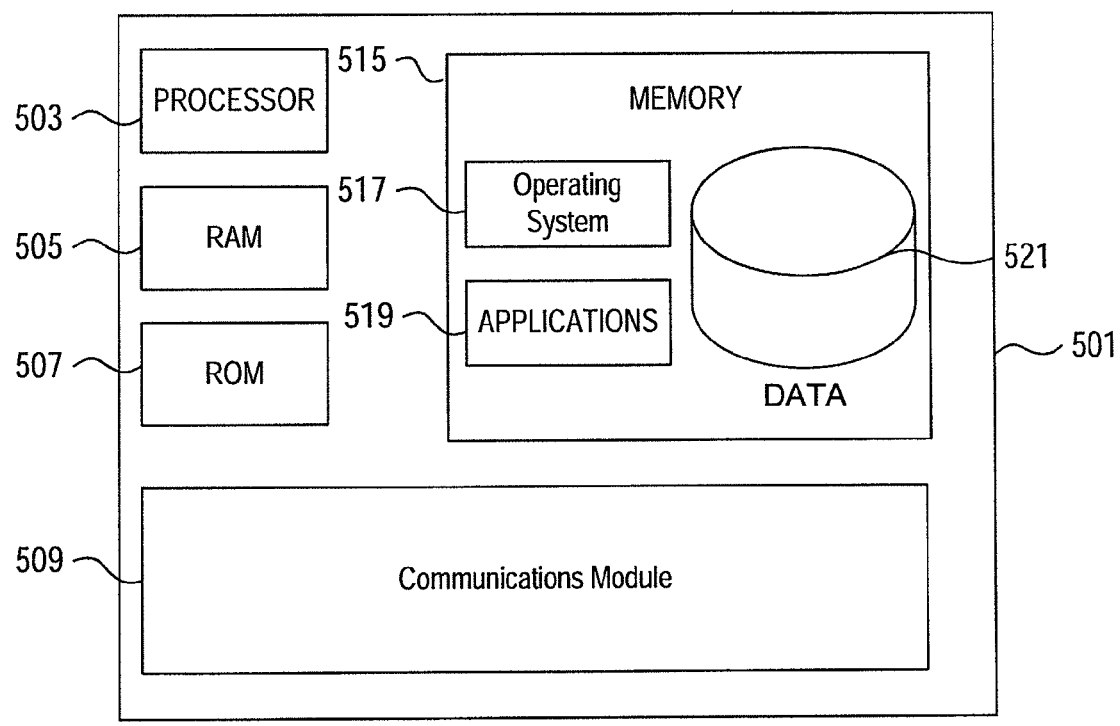
FIG. 5 shows an illustrative operating environment in which various aspects of the embodiments may be implemented.

FIG. 5 illustrates an example of computing platform 501 for supporting Context Server 215 or devices 204-209 that may be used according to one or more illustrative embodiments. Computing platform 501 is only one example of a suitable computing environment and is not intended to suggest any limitation as to the scope of use or functionality of the embodiments. Computing platform 501 should not be interpreted as having any dependency or requirement relating to any one or combination of components shown in the illustrative computing platform 501.

The embodiments are operational with numerous other general purpose or special purpose computing system environments or configurations. Examples of well known computing systems, environments, and/or configurations that may be suitable for use with the embodiments include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Computing platform 501 may have a processor 503 for controlling overall operation of the computing platform 501 and its associated components, including RAM 505, ROM 507, communications module 509, and memory 515. Computing platform 501 typically includes a variety of computer readable media. Computer readable media may be any available media that may be accessed by computing platform 501 and include both volatile and nonvolatile media, removable, and non-removable media. By way of example, and not limitation, computer readable media may comprise a combination of computer storage media and communication media.

Computer storage media may include volatile and nonvolatile, removable and non-removable media implemented in any method or technology for storage of information such as computer readable instructions, data structures, program modules or other data. Computer storage media may include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 501.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Although not shown, RAM 505 may include one or more are applications representing the application data stored in RAM memory 505 while the computing device is on and corresponding software applications (e.g., software tasks), are running on the computing platform 501.

Communications module 509 may include an interface to communicate with a wireless gateway (e.g., gateways 211-212), SMS aggregator 213, or directly with a wireless carrier network.

Software may be stored within memory 515 and/or storage to provide instructions to processor 503 for enabling computing platform 501 to perform various functions, e.g., processes 600-1100 as shown in FIGS. 6-11, respectively. For example, memory 515 may store software used by computing platform 501, such as an operating system 517, application programs 519, and an associated database 521. Alternatively, some or all of the computer executable instructions for computing platform 501 may be embodied in hardware or firmware (not explicitly shown).

Database 521 may provide storage of electronic content for a mapping a user to a device type or for storing configuration information to pull and push content to the user. While database 521 is shown to be internal to computing platform 501, database 521 may be external to computing platform 501 with some embodiments.

Additionally, one or more application programs 519 used by the computing platform 501, according to an illustrative embodiment, may include computer executable instructions for invoking user functionality related to communication including, for example, email, short message service (SMS), and voice input and speech recognition applications.

Embodiments of the invention may include forms of computer-readable media. Computer-readable media may include any available media that can be accessed by a computing platform 501. Computer-readable media may comprise storage media and communication media. Storage media include volatile and nonvolatile, removable and non-removable media implemented in any method or technology for storage of information such as computer-readable instructions, object code, data structures, program modules, or other data. Communication media may include any information delivery media and typically embody data in a modulated data signal such as a carrier wave or other transport mechanism.

Although not required, one of ordinary skill in the art will appreciate that various aspects described herein may be embodied as a method, a data processing system, or as a computer-readable medium storing computer-executable instructions. For example, a computer-readable medium storing instructions to cause a processor to perform steps of a method in accordance with aspects of the embodiments is contemplated. For example, aspects of the method steps disclosed herein may be executed on a processor on a computing platform 501. Such a processor may execute computer-executable instructions stored on a computer-readable medium.

As understood by those skilled in the art, the steps that follow in the Figures may be implemented by one or more of the components in FIGS. 2 and 5 and/or other components, including other computing devices.

Figure 6:
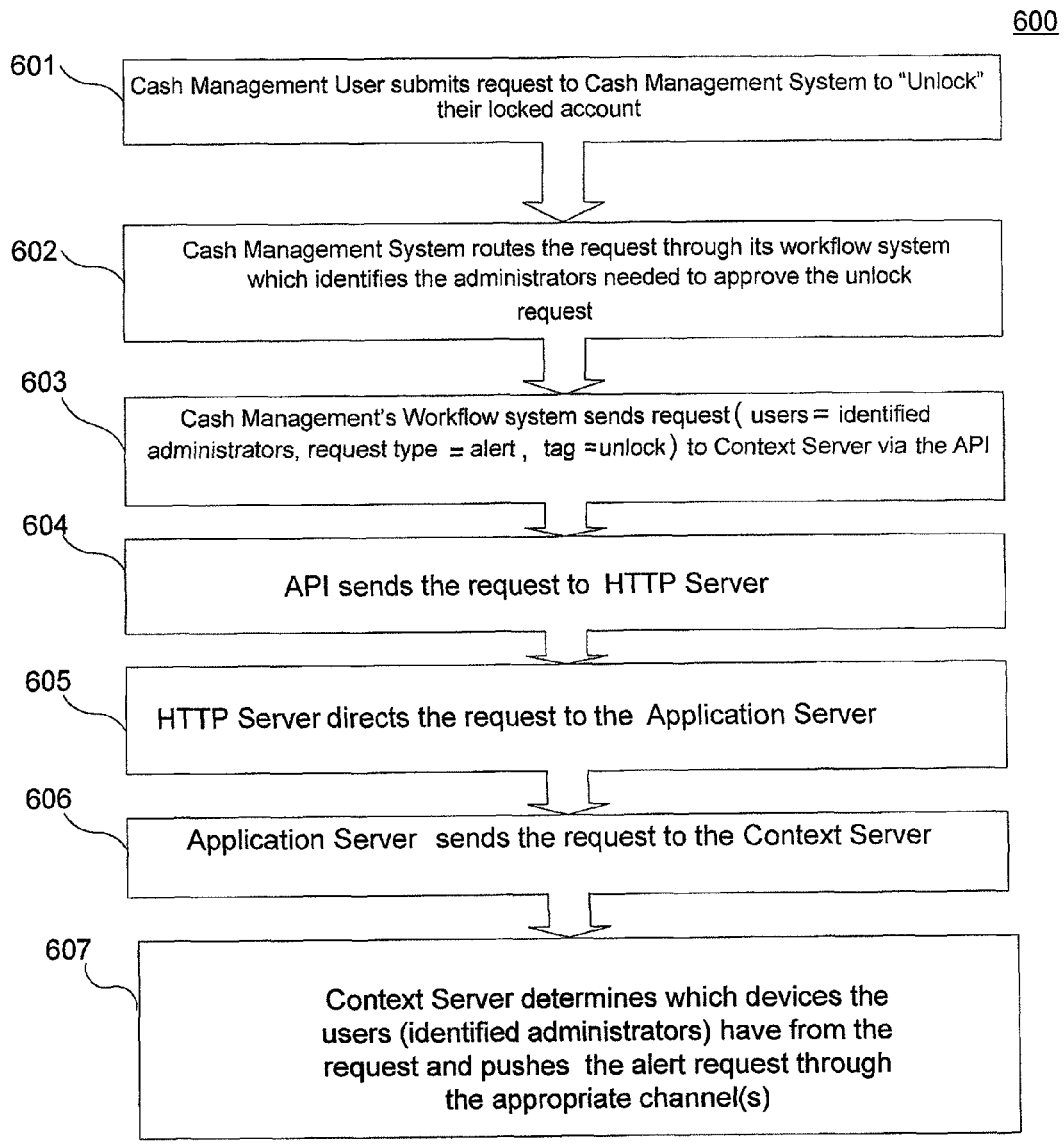
FIG. 6 shows a flow diagram in which customer requests that an account be unlocked in accordance with various aspects of the embodiments.

FIG. 6 shows flow diagram 600, in which a customer requests that an account be unlocked as illustrated in FIGS. 3 and 4 and in accordance with various aspects of the embodiments. Flow diagram 600 depicts a scenario in which a bank corporate treasury user is locked out of the user's cash management account. For the account to be unlocked, two of the user's company account administrators must approve the unlock request. The unlock request needs to be delivered to the account administrator's mobile device(s), which may be one of different types of mobile devices, e.g., devices 204-209. The administrator can then use the cash management mobile application on the administrator's device to approve and unlock the user's accounts.

In the flow diagrams shown in FIGS. 6-12, the user may change in a scenario as the scenario progresses. For example, in flow diagram 600, the user initially corresponds to the cash management user. Subsequently, the administrator becomes the user in order to approve the unlocking of the account for the cash management user.

At block 601 a cash management user submits a request to the cash management system (which is included in the infrastructure as business process 101 as shown in FIG. 1) to unlock the user's locked account (corresponding to screenshots 301-304 as shown in FIG. 3). The cash management system routes the request through its workflow and identifies the administrators needed to approve the unlock request at block 602.

The cash management's workflow then sends an alert request, in which the appropriate administrators are identified via the API at block 603, and consequently the API sends request 251 (as shown in FIG. 2) to HTTP Server 214 at block 604. HTTP Server 214 sends request 253 at block 605 to application server 211, which consequently sends the request to Context Server 215 at block 606.

Context Server 215 determines which devices the users (identified administrators) have from the request and pushes the alert request through the appropriate channel(s) at block 607. For different device types, the request may be directed differently. For example, with certain devices 205, the push may be sent through an External Wireless Gateway 212 to a Network Operations Center 210. With other devices 204, the push may be sent through a Wireless Gateway 211. With another device 207, the push is sent directly to device 207 through the wireless network and processed by client component 257.

Figure 7:
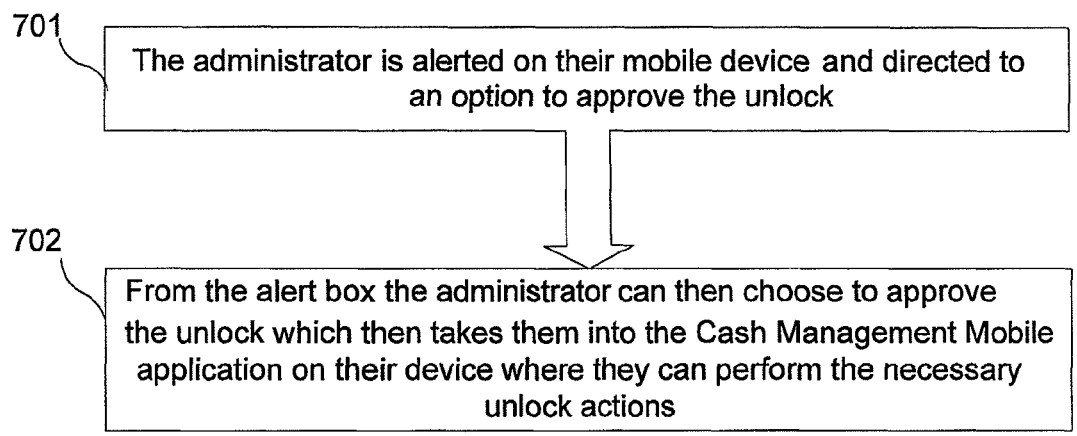
FIG. 7 shows a continuation of the flow diagram shown in FIG. 6 in accordance with various aspects of the embodiments.

FIG. 7 shows a continuation of flow diagram 600 shown in accordance with various aspects of the embodiments. Context Server 215 sends an alert at block 701 to the mobile device of the administrator (corresponding to screenshot 401 as shown in FIG. 4) with an option to approve the unlock request. At block 702 the administrator can chose to approve the unlock (corresponding to screenshot 403). The cash management mobile application generates a selectable display so that the administrator can perform the necessary actions to unlock the selected account.

Figure 8:
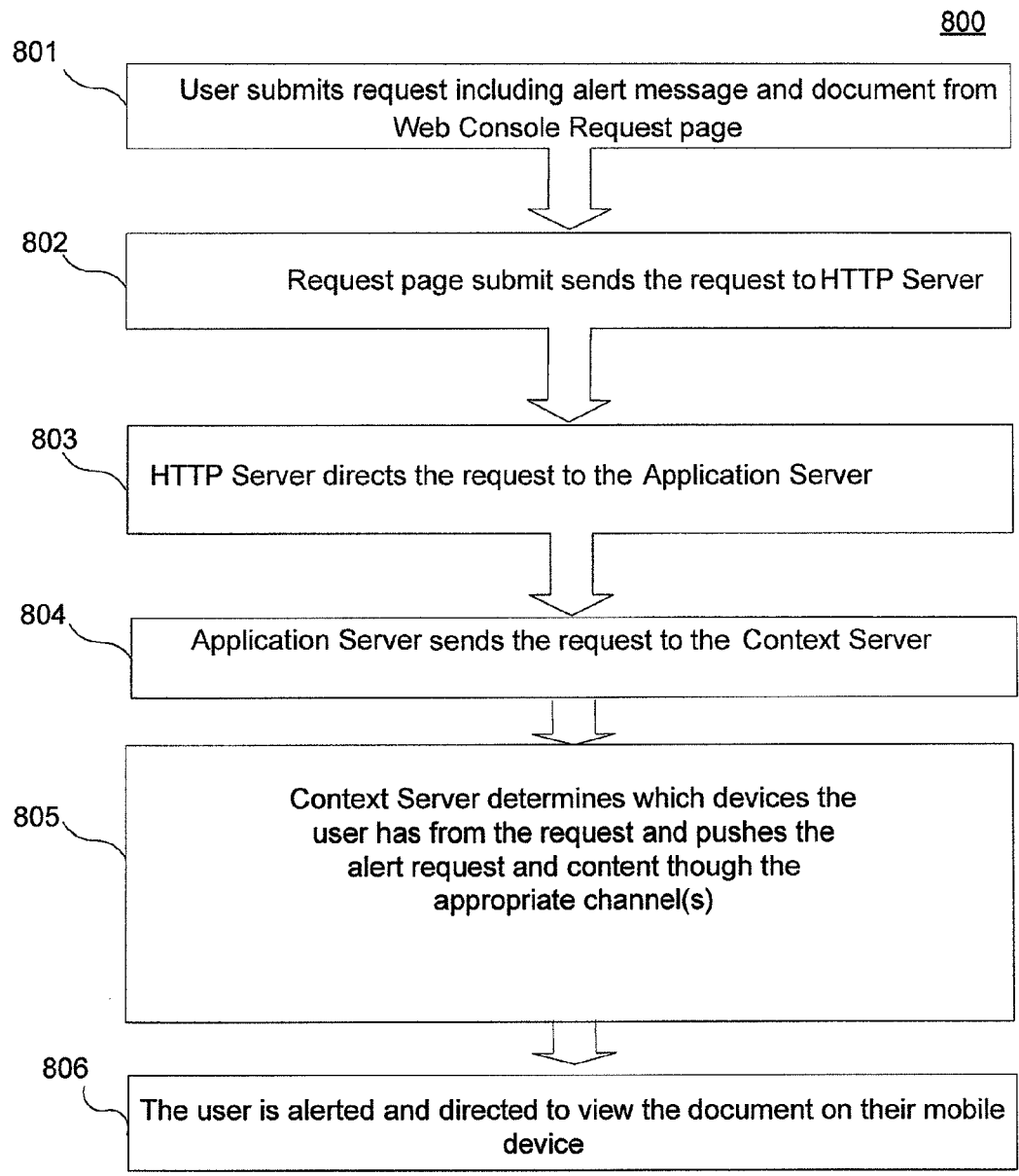
FIG. 8 shows a flow diagram in which a bank loan officer wants to push an alert and corresponding document to a customer in accordance with various aspects of the embodiments.

FIG. 8 shows flow diagram 800 in which a bank loan officer (the user) wants to push an alert and corresponding document to a customer in accordance with various aspects of the embodiments. Flow diagram 800 may depict a scenario in which a bank loan officer wants to push an alert and corresponding document to a customer for the customer's review. The alert and document content are delivered to the customer's mobile device(s), which may be one of different types of mobile devices, e.g., devices 204-209.

The bank loan officer initiates request 251 to system 200 at block 801, where the request includes an alert message and document content from a Context Request page (not explicitly shown) that is displayed on a Web console. Consequently the API forwards request 251 (as shown in FIG. 2) to HTTP Server 214 at block 802. HTTP server 214 sends request 253 at block 803 to application server 211, which consequently sends the request to Context Server 215 at block 804.

Context Server 215 determines which devices the user has from the request and pushes the alert request and content through the appropriate wireless channels at block 805, For different device types, the request and content may be directed differently. For example, with certain devices 205, the push may be sent through an External Wireless Gateway 212 to a Network Operations Center 210. With other devices 204, the push may be sent through a Wireless Gateway 211. With another device 207, the push is sent directly to device 207 through the wireless network and processed by client component 257. The pushes may also be sent securely and are logged.

The customer (user) is alerted and directed to view the document on the user's device at block 806.

Figure 9:
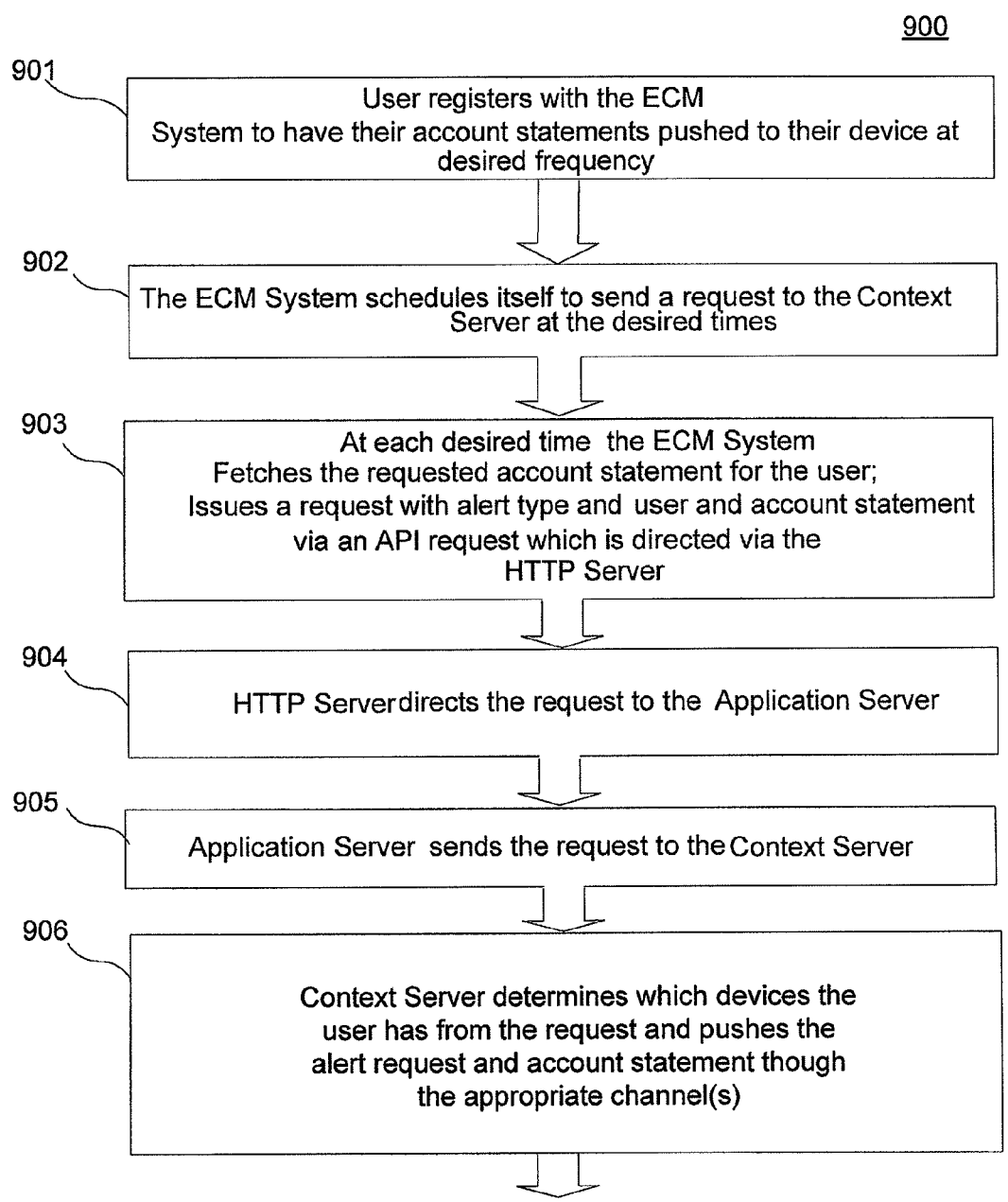
FIG. 9 shows a flow diagram in which a customer registers to have alerts and periodic account statements pushed to the customer's communication device in accordance with various aspects of the embodiments.

FIG. 9 shows flow diagram 900 in which a customer registers to have alerts and periodic account statements push to the customer's communication device in accordance with various aspects of the embodiments. Flow diagram 900 may depict a scenario in which a bank customer registers to have alerts and periodic account statements pushed to the customer's device(s). The alert and account content are delivered to the customer's mobile device(s), which may be one of different types of mobile devices, e.g., devices 204-209.

At block 901, a customer (user) registers with the enterprise content management (ECM) system (which may support business process 101 as shown in FIG. 1) to have account statements pushed to the customer's device at a desired frequency (e.g., every month). The ECM system schedules itself at block 902 to send request 251 to Context Server 215 at the desired times (e.g., on the first business day of each month).

At each desired time, ECM system fetches the request account statement for the user at block 903. The ECM system then issues request 251 with an alert type, user identification, and account statement via an API request, which is directed via HTTP server 214. HTTP server 214 sends request 253 at block 904 to application server 211, which consequently sends the request to Context Server 215 at block 905.

Context Server 215 determines which devices the user has from the request and pushes the alert request and account statement through the appropriate wireless channels at block 906. For different device types, the request and content may be directed differently. For example, with certain devices 205, the push may be sent through an External Wireless Gateway 212 to a Network Operations Center 210. With other devices 204, the push may be sent through a Wireless Gateway 211. With another device 207, the push is sent directly to device 207 through the wireless network and processed by client component 257. The pushes are typically sent securely and are logged.

FIG. 10 shows a continuation of flow diagram 900 in accordance with various aspects of the embodiments. At block 1001 the user (customer) is alerted and is directed to view the account statement on the customer's device. For devices that do not handle document display automatically, a context client library may be invoked to display the account statement via the ContentHandler API.

Figure 11:
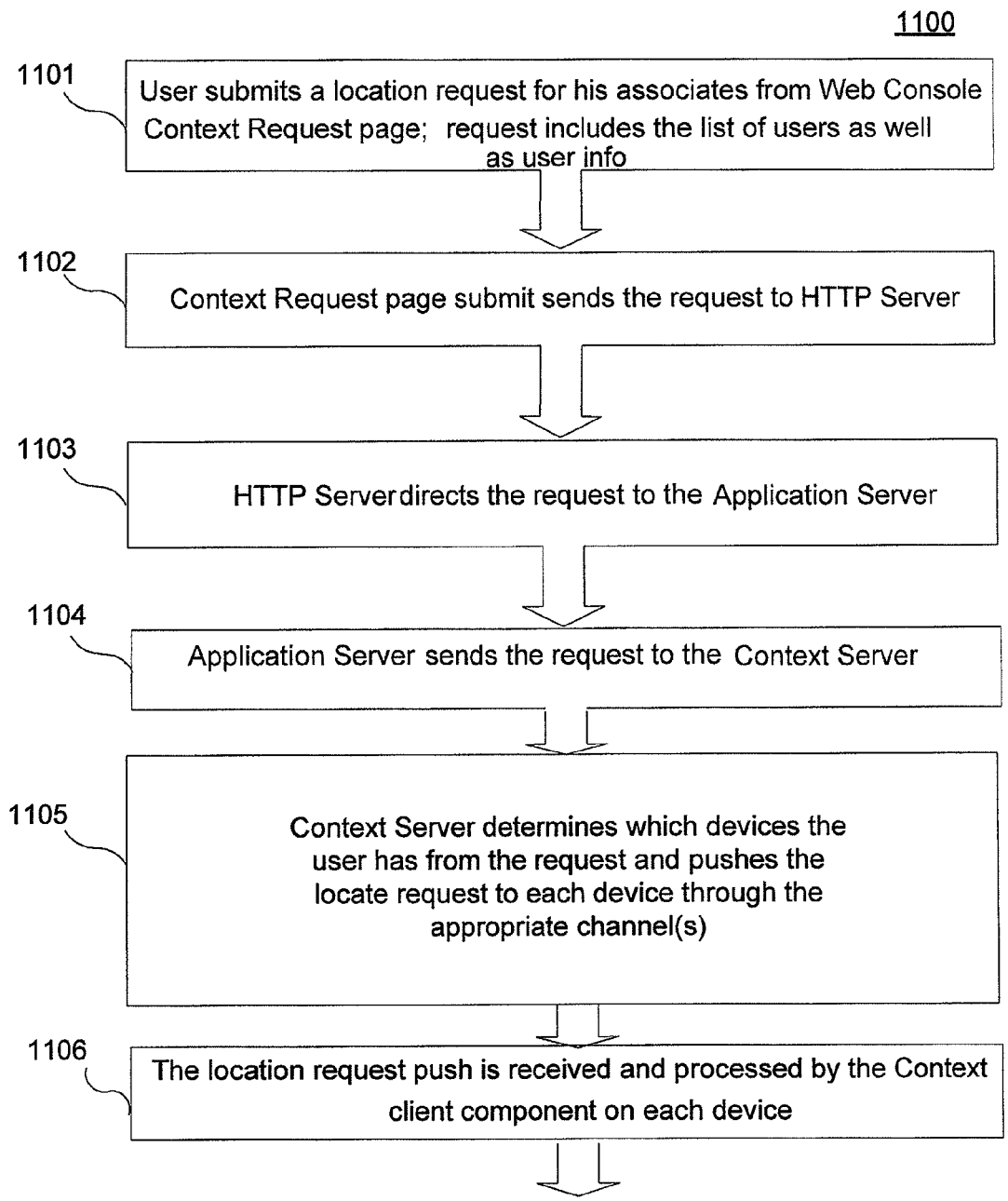
FIG. 11 shows a flow diagram in which a manager wants to determine the locations of the manager's associates in accordance with various aspects of the embodiments.

FIG. 11 shows flow diagram 1100 in which a manager wants to determine the locations of the manager's associates in accordance with various aspects of the embodiments. Flow diagram 1100 depicts a scenario in which a bank manager wants to determine the location of the manager's associates after an emergency event forces an evacuation of an office building. The bank manager uses a Web console to send a location request to the mobile devices of the associates via system 200. The associates may have different mobile devices, e.g., devices 204-209.

At block 1101, the banking manager (user) submits a location request for the manager's associates through a Context Request page that is displayed on the manager's Web console. However, embodiments also support the manager initiating a request through another type of device, including devices 204-209. The request may include a list of users (associates) as well as user information. Consequently, a application executing on the Web console initiates request 251 at block 1102 with a location type and user identifications of the associates and manager via an API request, which is directed via HTTP server 214. HTTP server 214 sends request 253 at block 1103 to application server 211, which consequently sends the request to Context Server 215 at block 1104.

Context Server 215 determines which devices the user has from the request and pushes the location request to each device through the appropriate wireless channels at block 1105. For different device types, the request and content may be directed differently. For example, with certain devices 205, the push may be sent through an External Wireless Gateway 212 to a Network Operations Center 210. With other devices 204, the push may be sent through a Wireless Gateway 211. With another device 207, the push is sent directly to device 207 through the wireless network and processed by client component 257. The pushes are typically sent securely and are logged.

At block 1106, the location request push is received and processed by the client component 254-259 on each device of the manager's associates.

Figure 12:
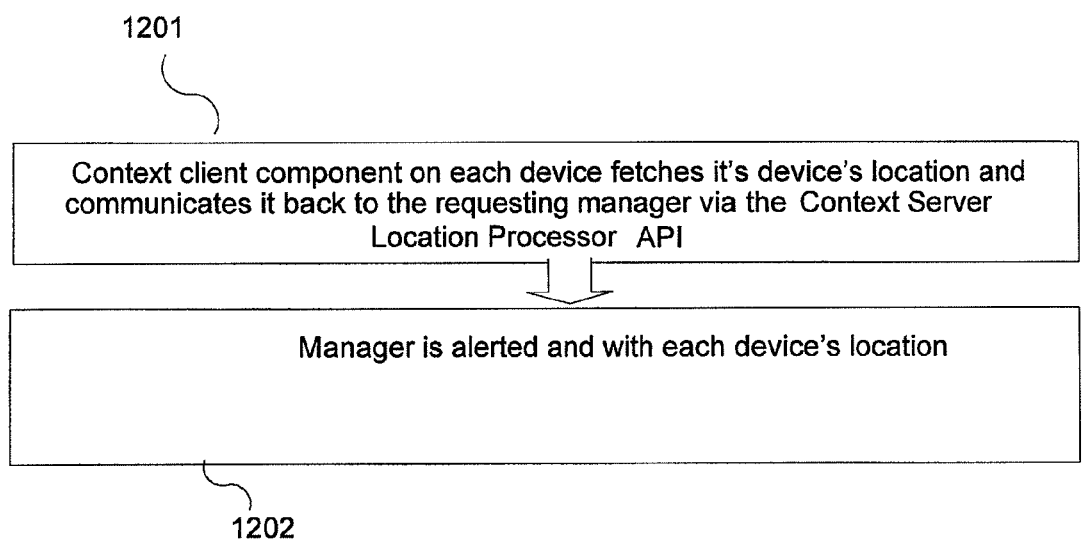
FIG. 12 shows a continuation of the flow diagram shown in FIG. 11 in accordance with various aspects of the embodiments.

FIG. 12 shows a continuation of flow diagram 1100 shown in accordance with various aspects of the embodiments. At block 1201 context client component 254-259 on each device of the manager's associates fetches its devices location and sends it back to the manager via Context Server 215 through the location processor API. The manager is then alerted with the location of each associate's device at block 1202.

Figure 13:
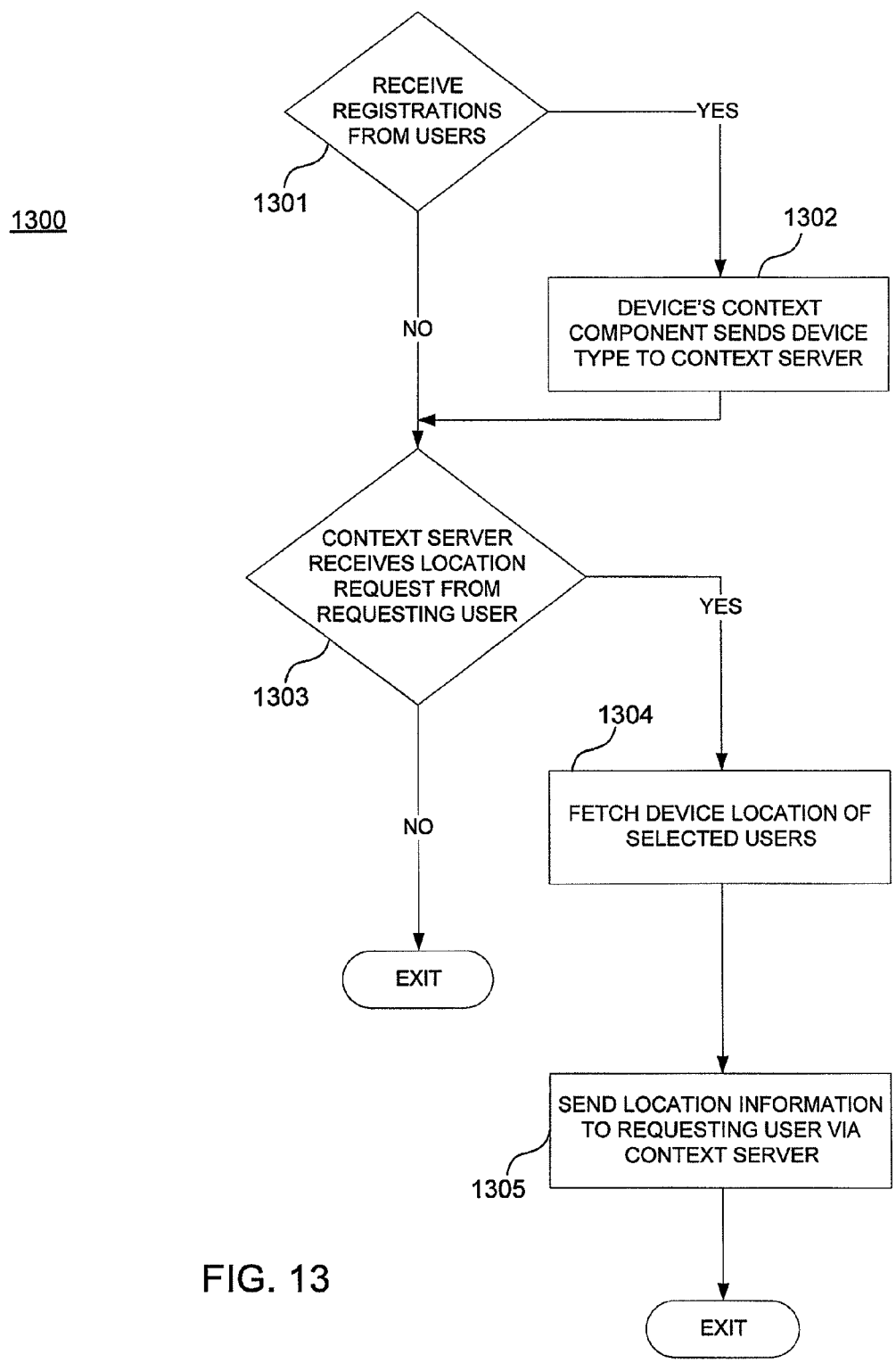
FIG. 13 shows a flow diagram for a client component in accordance with various aspects of the embodiments.

FIG. 13 shows flow diagram 1300 for a client component 254-259 in accordance with various aspects of the embodiments. With some embodiments, context client component 254-259 executes computing platform 501 as previously discussed.

At blocks 1301-1302 users register with Context Server 215 in order to provide the device types of each user's device. However, registrations typically occur at different times when user devices become active.

When a user (e.g., a manager) requests a location request at block 1303, device locations of selected users (e.g., associates) are fetched at block 1304, and the location information is provided to the requesting user at block 1305.

Figure 14:
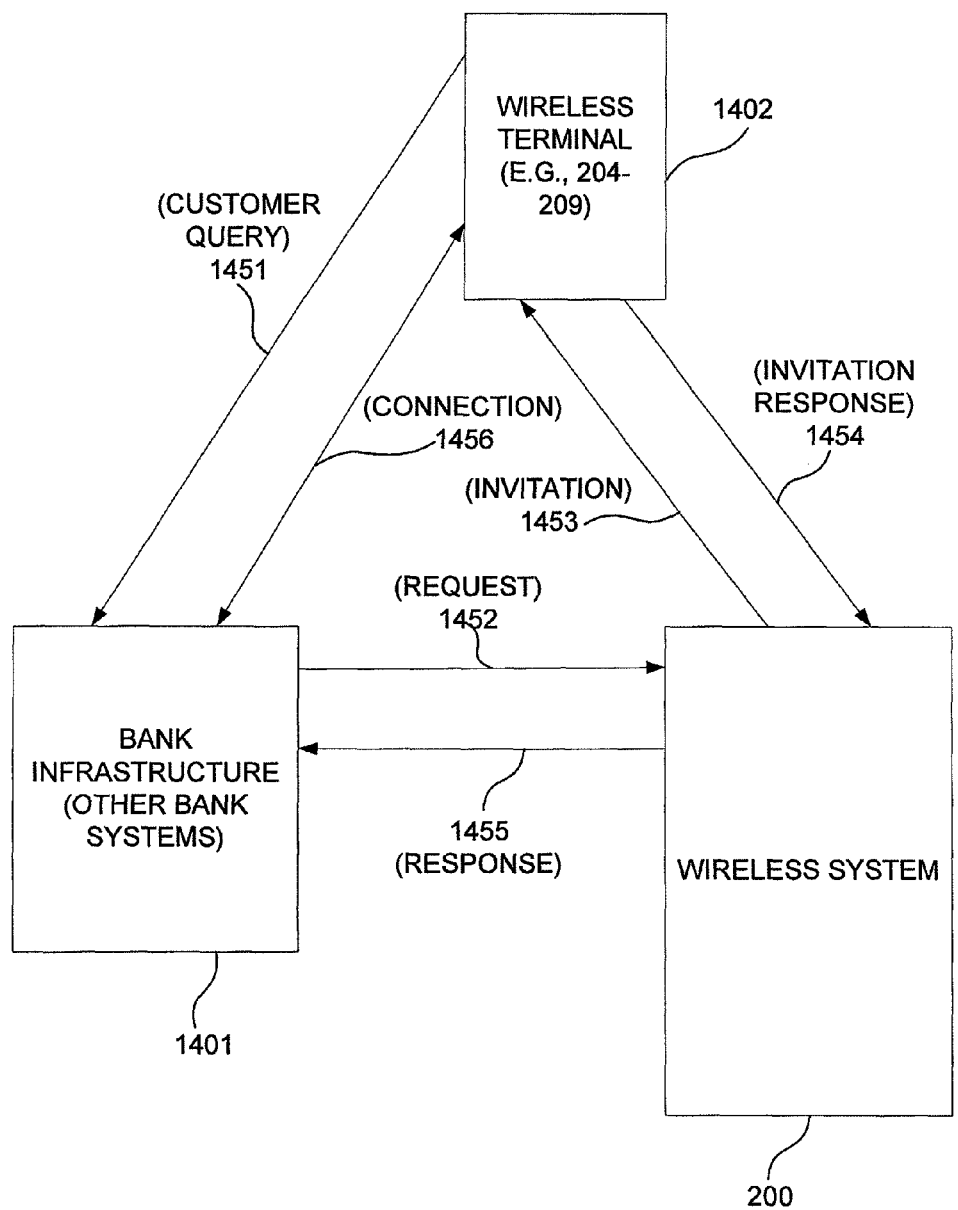
FIG. 14 shows a system in which a customer generates a query in accordance with various aspects of the embodiments.

FIG. 14 shows a system in which a customer generates a query in accordance with various aspects of the embodiments. A bank customer initiates a query request to bank infrastructure 1401 through terminal 1403 about a general question (e.g., identifying a branch/ATM location through a web service call or by text messaging through an automated system). Consequently, terminal 1402 generates query message 1451 to bank infrastructure 1401. Bank infrastructure 1401 may include different banking systems that are separate from system 200 or may be incorporated into system 200 as shown in FIG. 2. With some embodiments, bank infrastructure 1401 may receive query message 1451 over a communication channel without interacting with system 200, and consequently without message 1451 being transported via gateway 211 or 212.

Request 1452 (which may correspond to request 251 as shown in FIG. 2) is then sent from infrastructure 1401 to wireless system 200 with a user identification and query information that are contained in query message 1451. Wireless system 200 (e.g., context server 215 as shown in FIG. 2) accesses customer profile information to determine the device type of terminal 1402 and the query treatment for the customer. For example, the customer profile information may provide the customer's account type and may be indicative of whether the customer prefers human interaction with a bank representative. Based on the customer profile information, context server 215 may generate invitation message 1453 with contact information (e.g., a telephone number for the customer to call in order to reach a bank representative) and send message 1453 to terminal 1402 through the appropriate type of communication channel. While FIG. 14 shows that terminal 1402 generates message 1452 and receives invitation message 1453, messages 1452 and 1453 may be associated with different terminals (i.e., the customer generates the query request and receives the query response on different terminals).

While FIG. 14 shows system 200 sending invitation message 1453, server 215 may determine that only general information (e.g., the location of a bank branch or ATM) be sent to terminal 1402 without inviting the customer to communicate directly with the bank representative. The general information may be based on specific information associated with terminal 1402, such as the terminal's location so that the closest ATM or bank branch is provided.

If the customer is invited to communicate directly with a bank representative based on the customer profile, the customer may indicate whether bank representative should set up a connection to customer's wireless terminal (e.g., chat session or telephone call), as indicated by invitation response 1454. System 200 provides invitation response 1455 to infrastructure 1401, and the bank representative may then initiate non-gateway connection 1456 to terminal 1403 without further interaction with system 200. Alternatively, the customer may prefer to initiate a connection using contact information provided in invitation 1453 rather than having the bank representative call the customer.

Figure 15:
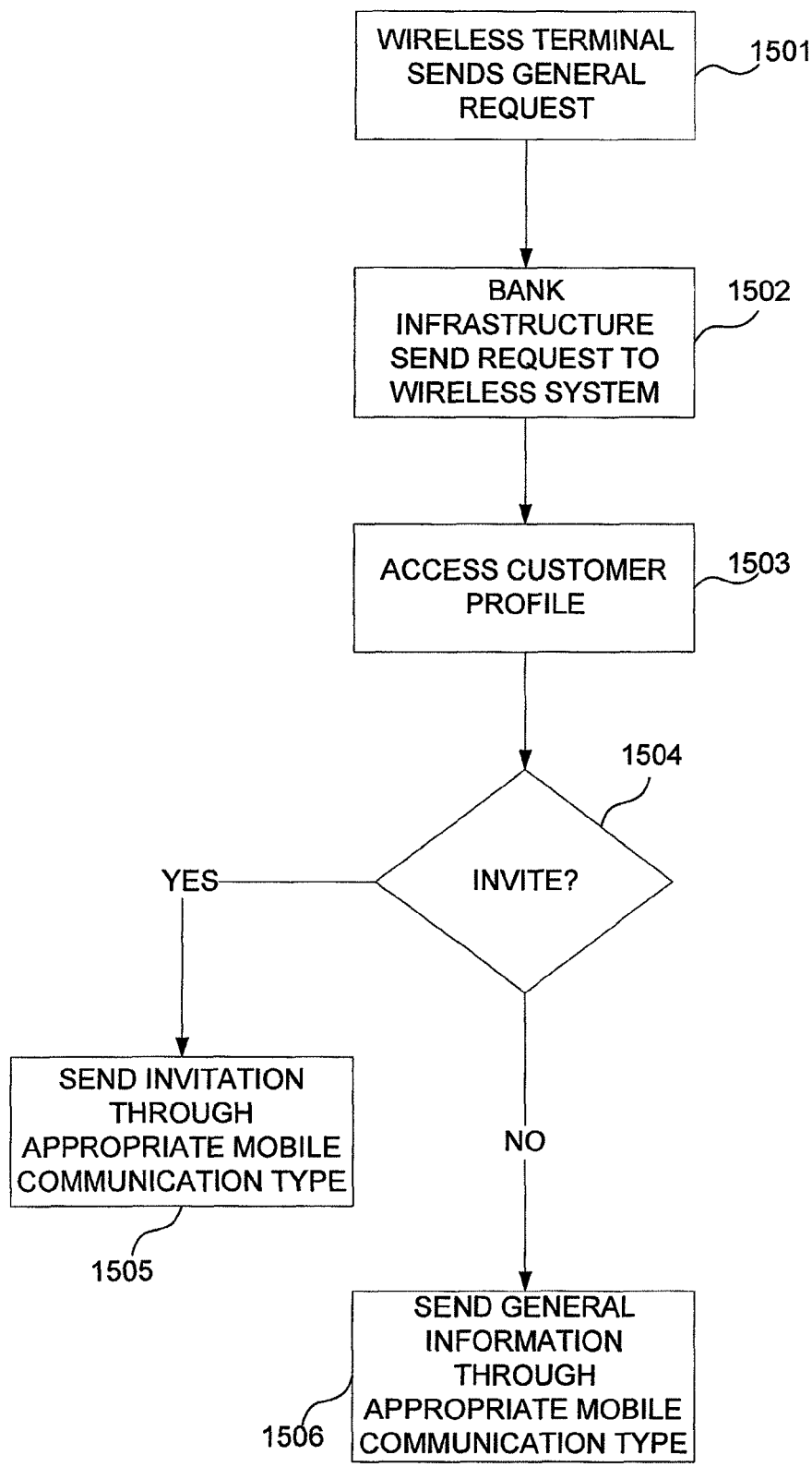
FIG. 15 shows a flow diagram in which a customer generates a query in accordance with various aspects of the embodiments.

FIG. 15 shows flow diagram 1500 that is associated with FIG. 14 in which a customer generates a query in accordance with various aspects of the embodiments. At block 1501, terminal 1402 sends a general request to infrastructure 1401, which then sends request 1452 to system 200 at block 1502. The customer profile (e.g., stored at data repository 217 as shown in FIG. 2) is accessed at block 1503 to determine whether the customer should be invited to interact directly with a bank representative as determined at block 1504. If so, the customer is provided information that answers the query as well as contact information at block 1505 so that the customer can communicate with the bank representative. Also, as previously discussed, system 200 directs the invitation message through the appropriate communication channel type based on the device type. If system 200 determines that the customer should not be invited at block 1504, then only general information related to the query is sent to the customer at block 1506.

Figure 16:
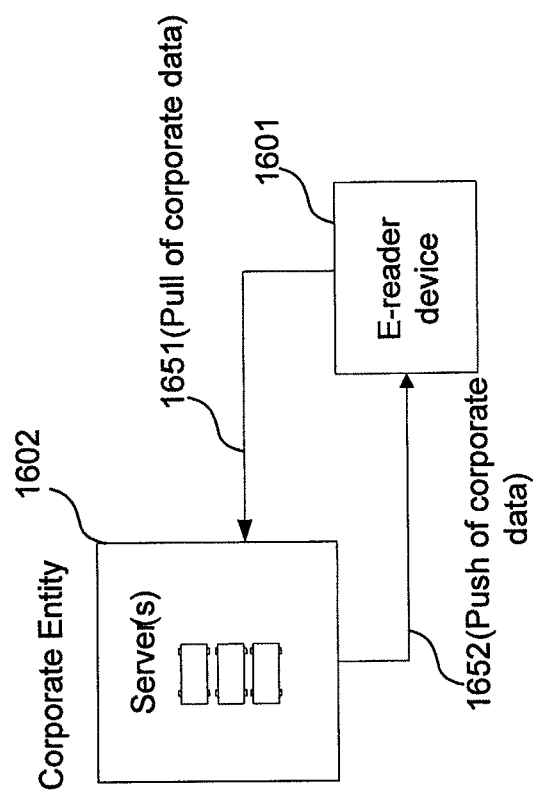
FIG. 16 shows a system flow for mobile content management in accordance with various aspects of the embodiments.

FIG. 16 shows a system flow for mobile content management in accordance with various aspects of the embodiments. With traditional systems, remote users (e.g., employees or associates) are often faced with the challenge of continually staying up to date on required training, product updates, and other critical learning opportunities while being asked to spend most of their time on the road.

Prior to leaving the office with traditional systems, users often have to search many documents all housed in different places throughout internal and external systems. Remote users cannot always access their company's networks while on the road so the remote users often resort to printing out critical documents prior to leaving the place of business. This approach often creates a conflict with efforts to reduce paper consumption. Hours of preparation and printing may be expended for each sales call in order to identify and find the right documents to support deals, learn about industries, and keep up with product information. Also there may be a need to keep all the documents in hard copy form so the employee does not have to rely on finding Wi-Fi signals for accessing the company's internal systems. These activities may not add value in a sales person's day and consequently decrease company productivity.

With an aspect of the embodiments, a consumer-focused product is migrated into an integrated corporate mobile filing system, allowing sales associates to have real-time access to critical documents while in a mobile environment, without being tethered to a laptop computer. Consequently, a new tool is provided for corporations or other organizations that provides value that traditional systems do not. The combination of a mobile reading device (e.g., device 1601 corresponding to device 209 as shown in FIG. 2) with an integrated internal system (corporate entity 1602 and corresponding to system 200 as shown in FIG. 2) for administering the management of the content on a device that does not currently exist with traditional systems. Even though corporate employees typically have to juggle hundreds of documents daily, corporate entity 1602 may support an employee when the employee is away from the office on sales calls or other business-related activities. For example, necessary or critical documents may be pushed to an employee's device automatically by a manager or other individual associated with an organization.

With an aspect of the embodiments, secure and user-friendly mobile device 1601 is dedicated to the needs of remote users (employees) (e.g., a global sales force, technicians, and repair personnel). Device 1601 leverages the e-ink technology so that an e-ink reader allows a user to access, manage and read documents without being "tethered" to a computer. Device 1601 allows for both user-initiated downloads from corporate entity 1602 (corresponding to pull of corporate data 1651) as well as corporate pushes by corporate entity 1602 (corresponding to push of corporate data 1652) in order to ensure that an employee is equipped with all the necessary information for the employee's job when they are away from the office. With an aspect of the embodiments, device 1601, which may function as a stand-alone device, is integrated with web platform 1602 that administers all pushes of information to device 1601.

Referring to FIG. 2, system 200 may include corporate entity 1602. According to an aspect of the embodiments, corporate entity 1602 may push updated documents to device 1601 when a previously-pulled document has been revised. For example, documents may be pushed to mobile device 1601 based on update configuration information (e.g., time of updating or frequency of updating documents).

With an aspect of the embodiments, technology is incorporated to display text on a screen of device 1601 in a way that is easily readable, even in sunlight. E-reader device 1601 may allow consumers to store large volumes of text in the form of books, magazines and newspapers. Device 1601 may support electronic paper, e-paper, or electronic ink display to mimic the appearance of ordinary ink on paper. Unlike a flat panel display, which uses a backlight to illuminate its pixels, electronic paper typically reflects light like ordinary paper and is capable of holding text and images indefinitely without drawing electricity, while allowing the image to be changed later.

Pushing content from corporate entity 1602 to device 1601 may offer a number of capabilities for a business user as well as reduce paper consumption. For example, an associate may quickly and easily obtain and store product updates and industry documentation. Managers may also ensure that associates have necessary updated information in an essentially real-time environment by initiating a push for the selected information to selected remote users. Consequently, associates can review draft documents and make notes for changes, quickly and easily access and store a multitude of newspapers and industry magazines, and access mobile device 1601 without a Wi-Fi hot spot. Moreover, remote technicians can access volumes of instructional manuals.

Figure 17:
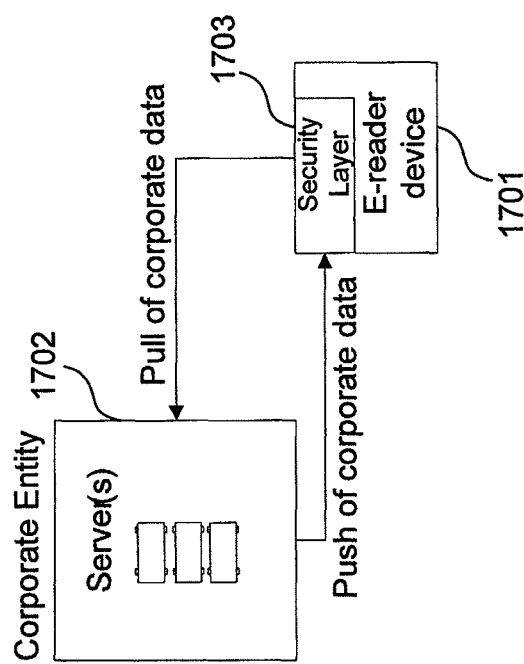
FIG. 17 shows a system flow for mobile content management in accordance with various aspects of the embodiments.

FIG. 17 shows a system flow for mobile content management in accordance with various aspects of the embodiments. Corporate entity 1702 and device 1701 are similar to corporate entity 1602 and device 1601; however, security management is also supported by security layer component 1703 in conjunction with corporate entity 1702. For example, with some embodiments, security management verifies that a user has permission to the selected documents, the actual user is really the identified user, and the content is sufficiently encrypted when the content is pushed or pulled.

Figure 18:
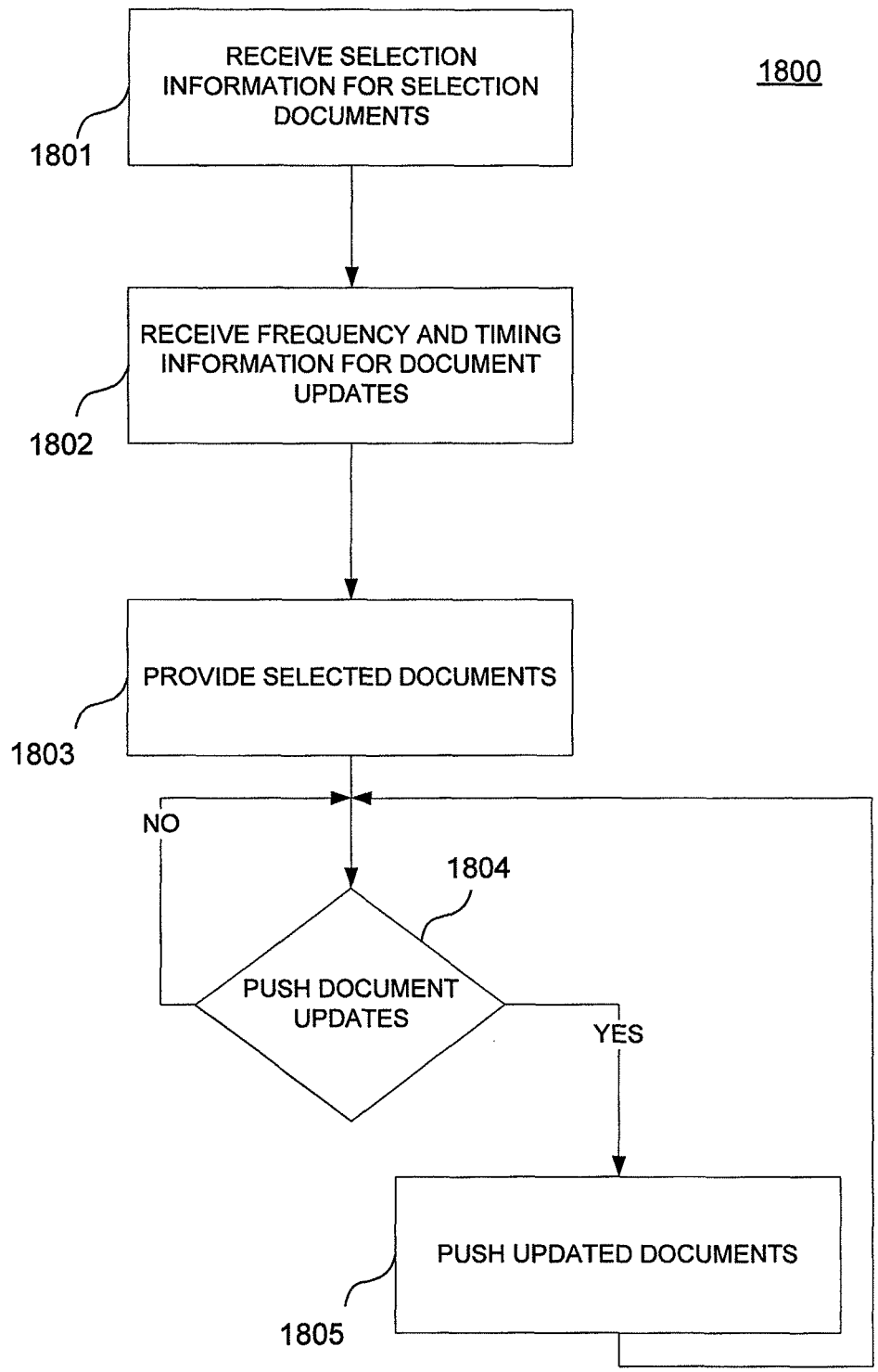
FIG. 18 shows a flow diagram for mobile content management in accordance with various aspects of the embodiments.

FIG. 18 shows flow diagram 1800 for mobile content management in accordance with various aspects of the embodiments. Process 1800 may begin when an associate is ready to prepare for a sales call. The associate may access an internal website and select the documents that are needed from a drop down menu that is displayed on device 1601. In addition, the associate may choose the frequency and timing for any push of content to the mobile content manager of device 1601, e.g., client component 259 as shown in FIG. 2. The requested documents may be quickly downloaded (pull) to the mobile device 1601 and may be available for reading. The selected document may be subsequently pushed when the document has been updated. For example, the document may be updated on a daily basis or may be updated at a given time. Also, with some embodiments, another user (e.g., a manager may request that a selected document be pushed to the remote user (e.g., an associate) at a selected time to keep the remote user updated with current information.

Referring to FIG. 18, configuration information is received by corporate entity 1602 from device 1601 for pulling and/or pushing content at block 1801. For example, the user may enter selected documents through a document menu (not explicitly shown). In addition, the user may enter information for updating the content, where the content is pushed by corporate entity 1602 at block 1802. Alternatively, with some embodiments, the configuration information may be automatically entered by client component 259 so that the user is not burdened to enter the information.

The selected documents (content) are then pushed to device 1601 at block 1803. Process 1800 subsequently determines whether the selected documents should be updated at block 1804. If so, the documents are pushed at block 1805. Referring to FIG. 2, for example, the updated documents may be pushed from Context Server 215 via a wireless carrier network (tier 203) to e-reader device 209.

According to an additional or alternative aspect, e-ink reader users may elect to subscribe to information feeds such as information streams, newspapers and other documents that are periodically or aperiodically updated. The subscriptions may be processed by a document provider such that when an update occurs or new information is available, the data may be automatically pushed to a user's e-ink reader. In one or more arrangements, the information may be provided to a user's e-ink reader rather than other devices associated with the user based on the nature of the information and the readability of documents on e-ink readers. For example, newspapers or other documents with significant amounts of text and thus, a corporate system may automatically select to transmit the newspaper or other document to the e-ink reader rather than, for example, a smartphone device. Alternatively or additionally, the user may select the device to receive the subscribed information. Further, the schedule upon which information is updated or pushed to the user's device may be defined by the user or may be automatically defined based on when the information is updated or some other schedule.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments. They may determine that the requirements should be applied to third party service providers (e.g., those that maintain records on behalf of the company).

We claim:

1. A computer-assisted method for updating electronic content of a document to a first user comprising:
   presenting a plurality of display items comprising first and second display items that correspond to first and second choices, respectively, for updating the electronic content, wherein the first choice specifies periodical updating of the electronic content of the document to the first user and the second choice specifies a given time for updating the electronic content of the document to the first user;
   receiving, by a computer system, a request for selected electronic content in the document, the request including updated configuration information, wherein the updated configuration information includes at least one updated updating characteristic about updating the electronic content and comprises one of the plurality of choices, wherein the plurality of choices further comprises a third display item corresponding to a third choice and wherein the third choice specifies updating, by a different user, a selected document at a specific time to the first user;
   mapping, by the computer system, a user identification to a plurality of device types;
   identifying a first device from the plurality of device types based on a content characteristic of the selected electronic content, wherein the first device is one of a plurality of devices associated with the first user;
   downloading, by the computer system, a first version of the selected electronic content to the first device; and
   pushing, by the computer system, an updated version of the selected electronic content in the document to the first device based on the updated configuration information, wherein the updated version comprises a revision of the first version of the selected electronic content.

2. The method of claim 1, wherein the identifying comprises:
   when an amount of text of the selected electronic content exceeds a predetermined limit, identifying the first device, said first device comprising an electronic ink display; and
   when the amount of text does not exceed the predetermined limit, identifying a second device based on a user preference, said second device being different from said first device.

3. The method of claim 1, further comprising:
   verifying permission to access the selected electronic document prior to downloading the selected electronic content and pushing the updated version.

4. The method of claim 1, wherein the plurality of choices further comprises a third display item corresponding to a third choice, wherein the third choice specifies updating, by a different user, a selected document at a specific time to the first user.

5. The method of claim 1 further comprising:
   directing, by the computer system, the electronic content through a mobile communication channel type to the first device based on a device type.

6. The method of claim 5, wherein the device type is indicative of an electronic ink display capability, the method further comprising:
   directing, by the computer system, the electronic content to an electronic ink device based on the device type.

7. The method of claim 5 further comprising:
   formatting the electronic content to a format compatible to the device type, wherein different device types support different formats.

8. A non-transitory computer-readable storage medium storing computer-executable instructions that, when executed, cause a processor to perform:
   presenting a plurality of display items comprising first and second display items that correspond to first and second choices, respectively, for updating electronic content, wherein the first choice specifies periodical updating of the electronic content of a document to a first user and the second choice specifies a given time for updating the electronic content of the document to the first user;
   receiving a request for selected electronic content in the document, the request including updated configuration information, wherein the updated configuration information includes at least one updated updating characteristic about updating the electronic content and comprises one of the plurality of choices, wherein the plurality of choices further comprises a third display item corresponding to a third choice and wherein the third choice specifies updating, by a different user, a selected document at a specific time to the first user;
   mapping a user identification to a plurality of device types;
   identifying a first device from the plurality of device types based on a content characteristic of the selected electronic content, wherein the first device is one of a plurality of devices associated with the first user;
   downloading a first version of the selected electronic content to the first device; and
   pushing an updated version of the selected electronic content in the document to the first device based on the updated configuration information, wherein the updated version comprises a revision of the first version of the selected electronic content.

9. The computer-readable medium of claim 8, wherein the processor performs:
   when an amount of text of the selected electronic content exceeds a predetermined limit, identifying the first device, said first device comprising an electronic ink display; and
   when the amount of text does not exceed the predetermined limit, identifying a second device based on a user preference, said second device being different from said first device.

10. The computer-readable medium of claim 8, wherein the processor performs:
    verifying permission to access the selected electronic document prior to downloading the selected electronic content and pushing the updated version.

11. The computer-readable medium of claim 8, wherein the processor performs:
    directing the electronic content through a mobile communication channel type to the first device based on a device type.

12. The computer-readable medium of claim 11, wherein the device type is indicative of an electronic ink display capability and wherein the processor performs:
    directing the electronic content to an electronic ink device based on the device type.

13. The computer-readable medium of claim 11, wherein the processor performs:
    formatting the electronic content to a format compatible to the device type, wherein different device types support different formats.

14. An apparatus comprising:
at least one memory; and
at least one processor coupled to the at least one memory and configured to perform, based on instructions stored in the at least one memory:
presenting a plurality of display items comprising first and second display items that correspond to first and second choices, respectively, for updating electronic content, wherein the first choice specifies periodical updating of the electronic content of a document to a first user and the second choice specifies a given time for updating the electronic content of the document to the first user;
receiving a request for selected electronic content in the document, the request including updated configuration information, wherein the updated configuration information includes at least one updated updating characteristic about updating the electronic content and comprises one of the plurality of choices, wherein the plurality of choices further comprises a third display item corresponding to a third choice and wherein the third choice specifies updating, by a different user, a selected document at a specific time to the first user;
mapping a user identification to a plurality of device types;
identifying a first device from the plurality of device types based on a content characteristic of the selected electronic content, wherein the first device is one of a plurality of devices associated with the first user;
downloading a first version of the selected electronic content to the first device; and
pushing an updated version of the selected electronic content in the document to the first device based on the updated configuration information, wherein the updated version comprises a revision of the first version of the selected electronic content.

15. The apparatus of claim 14, wherein the at least one processor is further configured to perform:
when an amount of text of the selected electronic content exceeds a predetermined limit, identifying the first device, said first device comprising an electronic ink display; and
when the amount of text does not exceed the predetermined limit, identifying a second device based on a user preference, said second device being different from said first device.

16. The apparatus of claim 14, wherein the at least one processor is further configured to perform:
verifying permission to access the selected electronic document prior to downloading the selected electronic content and pushing the updated version.

17. The apparatus of claim 14, wherein the at least one processor is further configured to perform:
directing the electronic content through a mobile communication channel type to the first device based on a device type.

18. The apparatus of claim 17, wherein the device type is indicative of an electronic ink display capability and wherein the at least one processor is further configured to perform:
directing the electronic content to an electronic ink device based on the device type.

19. The apparatus of claim 17, wherein the at least one processor is further configured to perform:
formatting the electronic content to a format compatible to the device type, wherein different device types support different formats.

* * * * *

UNITED STATES PATENT AND TRADEMARK OFFICE
CERTIFICATE OF CORRECTION

PATENT NO. : 8,930,498 B2  
APPLICATION NO. : 12/751502  
DATED : January 6, 2015  
INVENTOR(S) : Elizabeth S. Votaw et al.

Page 1 of 3

It is certified that error appears in the above-identified patent and that said Letters Patent is hereby corrected as shown below:

On the Title Page, item (75) Inventors, Line 3:
   Please delete "Dallas, TN" and insert --Dallas, TX--

In the Claims

In Column 15, Claim 4, Lines 53-57:
   Please delete "4. The method of claim 1, wherein the plurality of choices further comprises a third display item corresponding to a third choice, wherein the third choice specifies updating, by a different user, a selected document at a specific time to the first user."

In Column 15, Claim 5, Line 59:
   Please delete "5." and insert --4.--

In Column 15, Claim 6, Line 63:
   Please delete "6." and insert --5.--

In Column 15, Claim 6, Line 63:
   Please delete "method of claim 5," and insert --method of claim 4,--

In Column 16, Claim 7, Line 1:
   Please delete "7." and insert --6.--

In Column 16, Claim 7, Line 1:
   Please delete "method of claim 5," and insert --method of claim 4,--

In Column 16, Claim 8, Line 5:
   Please delete "8." and insert --7.--

Signed and Sealed this  
Twenty-first Day of July, 2015

Michelle K. Lee  
*Director of the United States Patent and Trademark Office*

In Column 16, Claim 9, Line 38:
    Please delete "9." and insert --8.--

In Column 16, Claim 9, Line 38:
    Please delete "method of claim 8," and insert --method of claim 7,--

In Column 16, Claim 10, Line 48:
    Please delete "10." and insert --9.--

In Column 16, Claim 10, Line 48:
    Please delete "method of claim 8," and insert --method of claim 7,--

In Column 16, Claim 11, Line 53:
    Please delete "11." and insert --10.--

In Column 16, Claim 11, Line 53:
    Please delete "method of claim 8," and insert --method of claim 7,--

In Column 16, Claim 12, Line 58:
    Please delete "12." and insert --11.--

In Column 16, Claim 12, Line 58:
    Please delete "method of claim 11," and insert --method of claim 10,--

In Column 16, Claim 13, Line 63:
    Please delete "13." and insert --12.--

In Column 16, Claim 13, Line 63:
    Please delete "method of claim 11," and insert --method of claim 10,--

In Column 17, Claim 14, Line 1:
    Please delete "14." and insert --13.--

In Column 18, Claim 15, Line 3:
    Please delete "15." and insert --14.--

In Column 18, Claim 15, Line 3:
    Please delete "method of claim 14," and insert --method of claim 13,--

In Column 18, Claim 16, Line 12:
    Please delete "16." and insert --15.--

In Column 18, Claim 16, Line 12:
    Please delete "method of claim 14," and insert --method of claim 13,--

CERTIFICATE OF CORRECTION (continued)
U.S. Pat. No. 8,930,498 B2

In Column 18, Claim 17, Line 17:
    Please delete "17." and insert --16.--

In Column 18, Claim 17, Line 17:
    Please delete "method of claim 14," and insert --method of claim 13,--

In Column 18, Claim 18, Line 22:
    Please delete "18." and insert --17.--

In Column 18, Claim 18, Line 22:
    Please delete "method of claim 17," and insert --method of claim 16,--

In Column 18, Claim 19, Line 27:
    Please delete "19." and insert --18.--

In Column 18, Claim 19, Line 27:
    Please delete "method of claim 17," and insert --method of claim 16,--